United States Patent Office 3,168,406
Patented Feb. 2, 1965

3,168,406
PROCESS FOR TREATING SOYBEAN FLOUR
TO IMPROVE ITS FLAVOR
Raymond J. Moshy, Westport, Conn., assignor to General Foods Corporation, White Plains, N.Y., a corporation of Delaware
No Drawing. Continuation of application Ser. No. 218,556, Aug. 22, 1962. This application Feb. 3, 1964, Ser. No. 342,266
10 Claims. (Cl. 99—99)

This invention relates to the production of soybean flour from soybean seed material. More particularly, the invention relates to the production of bland, odorless, substantially color-free soybean flour having improved properties for food use. The present application is a continuation of Serial No. 218,556, filed August 22, 1962, which, now abandoned, is a continuation-in-part of Serial No. 806,777, filed April 16, 1959, now abandoned.

Because of its low cost and high nutritional value, especially in essential protein, it is a generally recognized fact that the soybean is one of the best and cheapest sources of food energy in terms of calories per unit cost of production, provided it is consumed directly as a human food rather than after conversion to meat in farm animals as is the usual practice today. The greatest obstacle to the general use of soybeans as a source of human food products is the bitter, beany taste and objectionable odor and color of such products when prepared by prior art methods. Another objection to soybean food products, as heretofore produced, is their poor keeping qualities and their tendency to rancidity in ordinary storage.

Despite the fact that the soybean has been an important source of food to the Asiatic peoples for many centuries, all those well acquainted with the art of soybean processing seem to agree that natural, as well as processed, soybean flour or meal is unacceptable to the American people as regards its palatability and flavor appeal. The very numerous attempts to improve the taste, flavor, odor, color and keeping qualities of soy products date from ancient Chinese history up to the present time and have met with but little success when measured by modern standard food requirements, especially in the United States.

A study of the prior art, and in particular, the patent literature, reveals that soy refining methods suggested to date may be grouped in conformity with a number of expressed aims.

One such method aims at the removal or change of unpalatable constituents, volatile flavoring or odoriferous substances of whole soybeans by physical means singly or in a great variety of combinations, such as heating, wetting, soaking or washing in water, pressure or vacuum treatment with inert protective coating or inert gases as protection against oxidation during processing.

Another such method aims at the improvement and modification of odor and flavor with more or less complete deflavoring and deodorizing by chemical means, such as oxidizing agents (hydrogen peroxide), reducing agents (formaldehyde, acetaldehyde), protection - denaturing agents (ethyl alcohol-vapors), neutralizing agents (ammonia vapors), acidifying agents, and metal salts for fixing or precipitating soy constituents which were claimed to be responsible for undesirable flavor and odor.

Yet another such method aims at the neutralization of the bitter taste and natural odor by effecting reaction of the offensive principles of soy with unknown principles contained in the aleurone particles of wheat, by milling together in the presence of moisture.

Still another such method aims at the isolation of soy oil and lecithins from the soybean by solvent extraction at relatively high temperatures and producing more or less deodorized and deflavored soybean meal as a by-product. The flavor of soybean meal obtained by chemical solvent extraction with hydrocarbons, such as hexane, is known to be unacceptable from the food standpoint. Only those extraction methods employing solvents such as absolute ethyl alcohol, known as protection denaturing, as well as soybean deodorizing and deflavoring agents require consideration.

A further method aims at the isolation of soy protein from soybean meal by solubilization in an acid, alkali or salt solution, followed by removal of the insolubles by mechanical means and then precipitation of the protein from the solution.

The above cited methods of the prior art are generally so vague and indefinite as to leave to the reader's imagination the proper evaluation of such loosely employed terms as "dehydrating, deflavoring, flavor improvements, purifying, flavor refining, analyzing of bitter taste and odor, decoloring," and their application in practical uses in which the yardsticks of technical, chemical and organoleptic analyses may be applied by qualified analysts.

The soybean flour prepared by these prior art processes is unsatisfactory. More specifically, it is characterized by undesirable odor and color, general lack of blandness and a distinguishing flavor which immediately indicates its presence in food products. Accordingly, these heretofore produced products have found little or no use in bland, edible products.

It is an object of the present invention to produce an edible soybean flour, the blandness of flavor and odor of which is characterized by the fact that the flavor and odor of food containing a substantial portion of such edible soy protein flour make the detection of the latter's presence impossible.

It is another object of the present invention to produce an edible soy protein flour in a yield and of an edible flavor and odor not obtainable by any methods of the prior art.

It is still another object of the present invention to produce edible and palatable soy protein flours, preferably from solvent (hexane) extracted soy meal, which is a by-product of the commercial solvent extraction of soybean flakes at ordinary temperatures whereby the denaturing of proteins which results in lowered digestibility, lowered usefulness in baking and cooking, both commerical and private, lowered palatability, lowered water imbibing capacity, and lowered solubility in chemical agents is avoided.

It is a further object of the present invention to produce soy protein flours having, in addition to the properties indicated above, such low coloring power, particularly in the yellow and brown range, that acceptance by the consumer and marketability of food products containing substantial portions of said flours will not be adversely affected.

It is still a further object of the present invention to produce as a new article of manufacture a soybean protein flour of a protein concentration permitting a substantial concentration of proteins in human foods in the most direct way and at the least expense.

It has now been discovered that the objects of the present invention may be obtained by digesting soybean flour in an acidified aqueous solution, mixing said digested soybean flour with a water-miscible solvent, and separating from said mixture a soybean flour characterized by its blandness and freedom from odor and color. It is found that when soybean flour is prepared in accordance with this invention, the blend product is free of beany or bitter flavor and odor as well as substantially free of residual oil. The acid digestion liberates the bitter and beany flavor and odor components which are bound to an ingredient in the soybean flour, probably the protein. The water-miscible solvent dissolves and extracts the liberated bitter and beany components which are insoluble in water and also removes residual water soluble bitter and beany components, color and residual entrained oil.

The soybean flour as used in this invention includes dehulled, raw soybeans or oil-free soybeans in a cooked, cooked and toasted, or uncooked form which are in a divided state commonly known in the art as flakes, meals, flours, bits, cracked beans, etc. While the present invention is primarily directed to soybean flours as described hereinabove, the process is also eminently satisfactory for removing the beany and bitter flavor from soybean proteins which have been extracted and isolated either wholly or in part which usually are marketed in the form of a dry powder. The term "soybean flour" as used in the claims, therefore, is intended to embrace soybean flour and soybean proteins which have been extracted and isolated either wholly or in part.

The acidified aqueous solution which may be employed in carrying out the digestion operation may include water or aqueous solutions of water-miscible solvents. Such water-miscible solvents are volatile, organic and polar in nature. An acidified aqueous water-miscible solvent such as an acidified aqueous alcohol containing 72% by weight or less alcohol may be substituted for the acidified water. Such solutions may be acidified by the addition of any inorganic or organic acid with a relatively high degree of ionization, although it is preferred to employ mineral acids such as hydrochloric, sulfuric or phosphoric.

Bland, odorless soybean flour may be prepared by mixing water with soybean flour to form a slurry. Two to 100 parts by weight of water may be mixed with one part by weight of defatted, cooked, commercial soybean flour to form a slurry, preferably 2–10 parts by weight of water to one part by weight of defatted, cooked, commercial soybean flour, five parts by weight of water to one part by weight of soybean flour being preferred for ease of handling. To the water-soybean flour slurry is added sufficient concentrated acid to adjust the pH to the isoelectric point range of the soy proteins, that is, about pH 4–6, and preferably pH 4.5. While the product of the present invention is obtainable when employing an acid pH, optimum results are obtained at about pH 4–6. The product obtained at about pH 4–6 is higher in protein and the flour is easiest to handle at such pH since protein hydration and swelling are at a minimum.

The slurry of water and soybean flour which has been acidified is then heated to temperatures in the order of 70–212° F. and preferably 175–212° F. for optimum color, flavor and odor removal when employing cooked, defatted, commercial soybean flour. The slurry is digested, i.e. maintained, at the above temperatures for a period sufficiently long to insure complete and intimate contact of all the soybean surfaces with the liquid so that maximum release of beany and bitter flavor and odor may be effected. Periods of time in excess of about 2 hours at elevated temperatures of digestion cause a substantial increase in the amount of degradation which takes place and concurrently cause an increase in the level of bitterness in the soy. Furthermore, such excessive periods are not practical for economic reasons. The slurry is maintained at such temperature for a period in the order of 10–120 minutes, and preferably 60 minutes when the temperature employed is 180° F. The time and temperature of the digesting step are in inverse relationship to each other.

This digestion permits the extraction of the water solubles, freeing of the bitter and beany flavor and odor principles, and reduces the amount of water-miscible solvent required in subsequent processing.

Preferably, the supernatant liquid is then substantially removed from the digested soybean flour by filtration, centrifugation, or any other common means of separation leaving a filter cake which is further processed.

The resultant filter cake may be washed 1–3 times by forming a slurry with 2 to 100 parts by weight of water per part by weight of soybean flour employing about a 5–60 minute wash each time and substantially removing the supernatant liquid after each wash by any common means of separation. While it has been found with most wash waters that it is not necessary to adjust the pH of the resultant wash slurry, the pH of the slurry should be maintained between pH 4–6. The wash water removes the water remaining in the filter cake after the preceding acidified aqueous treatment, such water containing undesirable flavor and odor principles, color, oil, and other solubles. The washing permits a reduction in the amount of water-miscible solvent required in the subsequent processing and permits an easier repurification of such solvent.

While it is preferred to wash the soybean flour with water before further treatment after the digestion with the acidified aqueous solution, it has been found possible to eliminate the water washing when an excess of water-misible solvent is used in the subsequent treatment. Such treatment is particularly effective when the soybean flour is not readily filterable or separable such as when a very fine mesh meal is being used or when an uncooked, defatted, soybean flour which swells during the treatment is being used. In such cases the soybean flour slurry treated at about pH 4–6 is diluted with at least an equal volume of a water-miscible alcohol and then the supernatant liquid is removed from the slurry by any common separation means.

The digested soybean flour which is in the form of a filter cake is then mixed with a water-miscible solvent which is volatile, polar and organic in nature. While any water-miscible solvent such as ethers like 1,4-dioxane; ether alcohols like propylene glycol monoethyl ether; water-miscible esters like ethyl lactate may be employed to remove the undesirable bitter and beany flavor and odor, it is preferred to use water-miscible alcohols such as ethyl, isopropyl, methyl, tertiary butyl, etc., since these do not impart any flavor of their own to the product. While generally water-miscible solvents may be employed during solvent extraction or leaching at a concentration of 60 to 100% solvent, it is preferred when employing water-miscible alcohols to use them at a concentration of 80 to 100%. In the case of the preferred alcohol, ethyl alcohol, it has been found that alcohol concentrations of 80–100% are eminently satisfactory although it is preferred to use the azeotrope for economic reasons.

The digested filter cake is mixed with a water-miscible solvent employing 1–100 parts by weight of solvent to one part by weight of the original soybean flour employed to form a slurry, 3 to 5 parts to one being preferred for reasons of economy. The slurry of soybean flour and water-miscible solvent is heated to a temperature from about 70° F. to the reflux temperature of the solvent, although 140° F. or above is preferred in the case of isopropyl or ethyl alcohol when employing cooked, defatted, commercial soybean flour. The acid liberated water insoluble bitter and beany components, residual water soluble bitter and beany components, color and residual entrained oil are extracted from the soybean flour by maintaining it in contact with solvent at such temperatures for a period of 5–120 minutes although 5 to 30 minutes is preferred when employing a temperature of 140° F. The supernatant liquid is removed from the filter cake by any common separating means.

The slurry is maintained at the above temperatures for a period sufficiently long to insure complete and intimate contact of all the soybean surfaces with the liquid so that maximum beany and bitter flavor removal may be effected. Periods of time in excess of two hours are undesirable for economic reasons.

The slurry of soybean flour and alcohol is maintained at a pH of 4–6.5. The pH of the soybean flour in the alcohol solution may be determined by diluting the alcohol solution with water to less than a 50% concentration and then measuring the pH. If the pH is maintained above pH 4, losses due to protein solubilization are minimized. At pH's less than about 6.5, the beany flavor of the soybean flour is substantially completely removed, producing a superior product.

It is preferred to repeat the alcohol extraction a plurality of times, e.g. four times, although where alcohol is used in the earlier processing employing the acidified aqueous solution wherein the bitter and beany principles are freed from the protein flavor complexes, it is possible to repeat the alcohol treatment at least one less time. Furthermore, in such cases subsequent alcohol extraction is facilitated since there is less water present which must be removed by dehydration.

If a product having a substantially neutral pH is desired, sufficient alkali may be added prior to the last alcohol treatment step to adjust the pH of the cake to 6.5–7.5 just prior to separation of the supernatant liquor from the cake. The resultant filter cake is again slurried and treated with 1–100 parts by weight of solvent per part by weight of the original soybean flour as before. The slurry is then filtered and the resulting filter cake may be dried. Any common drying means may be employed to remove the solvent and residual moisture although the drying should be carried out so as to prevent the product from attaining a temperature of 212° F. since below this elevated temperature browning and denaturation of the protein is minimized. Where possible it is preferred to use temperatures in the order of 120–175° F.

Adjustment of the pH of the slurry to about pH 6.5 after treatment with the acidified aqueous solution results in a product which is readily hydratable and does not possess an undesirable acid taste, although it is preferred to adjust the pH of the soybean flour prior to the last alcohol treatment in order to assure complete removal of the undesirable flavor, odor and color components which are released by the acid treatment.

The order in which the steps of the present invention are employed is of the utmost criticality since it is only when the acidified aqueous treatment is followed by or is accompanied by a water-miscible solvent treatment that a bland, colorless, odorless soybean protein flour is obtained. If in the first step, the aqueous solution is not acidified or if the first step comprises the solvent treatment rather than the acidified aqueous treatment, the desirable bland, colorless, odorless product of the present invention is not obtained. While it is preferred to employ elevated temperatures during the process where cooked, defatted, commercial soybean flour is employed, it has been found preferable to employ room temperatures during processing where uncooked, defatted, commercial soybean flour is employed. The use of elevated temperatures with uncooked, defatted soybean flour merely increases the amount of beany flavor which must subsequently be removed.

It appears that when the water-miscible solvent is employed prior to the treatment with an acidified aqueous solution some extraction of the bitter and beany components takes place. However, this does not permit the substantially complete liberation of all the bitter and beany components since the complexes are not broken as in the present invention by acid treatment and then subsequently or concurrently removed by treatment with a water-miscible solvent. When employing uncooked, defatted, commercial soybean flour, it is not necessary to exceed solvent extraction temperatures of 140° F., and it is preferred to employ a temperature of about 75° F. When employing such temperatures, the soybean protein flour product obtained, in addition to being bland, odorless and colorless, also has gel-like characteristics when heated to 190° F. as a 10% solution in water. Ethyl alcohol of 80% or more concentration has the ability to extract and remove the anti-gelling factor present in the soybean flour and is the preferred solvent. Furthermore, when a soybean protein flour having gel-like characteristics is desired, the uncooked, defatted, commercial soybean flour may first be mixed with 3–100 and preferably 5 parts by weight of water per part by weight of flour to form a slurry. The pH of the slurry is adjusted to a pH greater than pH 7, preferably pH 9–13 and more preferably pH 10–11. The slurry is heated for 10 minutes to 24 hours at a temperature below 140° F. and preferably at about 75° F. to partially degrade the soybean protein. The so treated soybean flour is then treated by the hereinbefore described process commencing with the digestion in the acidified aqueous solution.

While the process of the present invention has been found to be eminently satisfactory where soybeans are to be deflavored, it has also been found to yield very satisfactory results where it is desired to remove the nutty, beany flavor of other seed materials such as a peanut flour and cottonseed flour.

The following examples illustrate several embodiments of the present invention:

Example 1

Two hundred pounds of cooked, defatted, commercial soybean flour having a moisture content of 4–10% was mixed with 800 pounds of hot water and to this mixture seven pounds of concentrated hydrochloric acid was added to obtain a pH of 4.5. The resulting slurry was treated for one hour at 180° F. The treated slurry was filtered in a vacuum filter and 400 pounds of filter cake containing 60% moisture was obtained. The filter cake was reslurried and washed in 600 pounds of water and held for 30 minutes at 180° F. The slurry was again filtered through a vacuum filter and 400 pounds of filter cake was obtained. The filter cake was mixed with 360 pounds of 99% isopropyl alcohol and the slurry treated for one-half at 160° F. The slurry was again filtered through a vacuum filter and 350 pounds of filter cake was obtained. The filter cake was again treated with 360 pounds of 99% isopropyl alcohol and maintained at a temperature of 160° F. for one-half hour. Sufficient 50% sodium hydroxide solution was added to the hot slurry to adjust the pH to 6.0 (when measured as a 10% aqueous slurry of the soy flour). The slurry was re-filtered and the resulting filter cake slurried with 450 pounds of 99% isopropyl alcohol. The slurry was heated to 100° F. and maintained at such temperature for one-half hour. The treated slurry was again filtered and 260 pounds of filter cake was obtained. The filter cake was dried in a vacuum pan drier at 28" of vacuum, the temperature within the drier being maintained at 110° F. One hundred and forty pounds of product was obtained. The product was bland and odorless.

Example 2

One hundred pounds of uncooked, defatted, commercial soybean flour having a moisture content of about 80% was mixed with 500 pounds of water at 75° F. and to this slurry was added sufficient concentrated hydrochloric acid to obtain a pH of 4.5. The slurry was maintained at 75° F. for 60 minutes. The slurry of soybean flour and water was filtered to obtain a filter cake which was then washed with 500 pounds of water, no pH adjustment being made on the water, the water temperature being 75° F. This washing treatment was repeated three additional times, filtering the supernatant from the filter cake between each wash. After the last wash, the filter cake obtained was slurried with 300 pounds of azeotropic ethyl alcohol having a temperature of 75° F. The slurry was agitated for fiive minutes and then the supernatant liquid filtered from the solids. The ethyl alcohol wash was repeated again with no adjustment of the pH. The third treatment was repeated precisely as before except that the pH of the slurry was adjusted to pH 7 (when measured as a 10% aqueous slurry of the soy flour) at the end of the wash. The treatment with ethyl alcohol was repeated one additional time with no further pH adjustment. Each alcohol wash employed 300 pounds of ethyl alcohol and the supernatant liquid was removed from the solids by filtration in each case. After the last alcohol treatment the filter cake was air dried. The product was a bland flavored, odorless, cream colored flour. Ten grams of this flour was heated to 194° F. in 100 ml. of water and an irreversible, white, pasty gel was obtained upon cooling.

*Example 3*

One hundred pounds of cooked, defatted, commercial soybean flour having a moisture content of about 8% was mixed with 500 pounds of 70% ethanol and the pH adjusted to 4.5 by adding concentrated hydrochloric acid. The temperature was raised to 175° F. and held for 60 minutes. The slurry was then filtered and the resulting filter cake was treated two times by slurrying it each time with 500 pounds of 70% ethanol. The slurry of filter cake and 70% ethanol was held at 175° F. for twenty minutes each time. The slurry was filtered between each 70% ethanol treatment and after the second treatment the filter cake was slurried twice with 250 pounds of 95% ethanol at 175° F. and held at 175° F. for 10–15 minutes. The slurry was filtered between the two 95% ethanol treatments and the pH of the second 95% ethanol slurry was adjusted to pH 8 and the slurry then filtered. The resulting filter cake was again slurried with 250 pounds of 95% ethanol at 175° F. for 10–15 minutes, filtered and the resulting filter cake air dried. The product was a bland flavored, odorless, white flour.

*Example 4*

One hundred pounds of cooked, defatted, commercial soybean flour having a moisture content of about 8% was mixed with 500 pounds of 70% ethanol and the pH adjusted to 4.5 by the addition of sufficient concentrated hydrochloric acid. The temperature was adjusted to 75° F. and held for sixty minutes. The slurry was then filtered and the resulting filter cake was treated two times by slurrying it each time with 500 pounds of 70% ethanol. The slurry of filter cake and 70% ethanol was held at 75° F. for twenty minutes each time. The slurry was filtered between each 70% ethanol treatment and after the second treatment the filter cake was slurried three times with 250 pounds of 95% ethanol at 75° F. and held at 75° F. for five minutes each time. The slurry was filtered between the three 95% ethanol treatments and the pH of the slurry was adjusted to 8.0 at the end of the third 95% ethanol treatment. The slurry was then filtered and again treated with 250 pounds of 95% ethanol at 75° F. for five minutes. The slurry was then filtered and the filter cake air dried. The product was a bland, odorless, white flour.

*Example 5*

Ten pounds of cooked, commercial, defatted soybean flour was slurried with 1,000 pounds of water and the pH adjusted to 4.5 by the addition of sufficient concentrated hydrochloric acid. The temperature was elevated to 175° F. and the slurry maintained at such temperature for one hour. The slurry was then centrifuged and the centrifuge cake obtained was then treated four times by slurrying it each time with 30 pounds of 95% ethanol. The temperature of the slurry during each treatment was held at 175° F. for five minutes. The slurry was centrifuged between each 95% ethanol treatment and at the end of the third treatment just prior to centrifugation the pH was adjusted to 7.5 The centrifuge cake was then treated with 30 pounds of 95% ethanol for the fourth time, centrifuged and the cake then air dried. The resulting product was a white, bland and odorless soybean flour.

*Example 6*

Ten pounds of uncooked, defatted soybean flour was mixed with 50 pounds of water to form a slurry. The pH of the slurry was adjusted to pH 10 by the addition of sodium hydroxide and the slurry then maintained at a temperature of 75° F. for 30 minutes. The pH of the slurry was adjusted by the addition of sufficient concentrated hydrochloric acid to pH 4.5 and maintained at such pH for 60 minutes. The slurry was diluted with 50 pounds of 95% ethyl alcohol, agitated and the supernatant liquid was removed by filtration. The resulting filter cake was washed three times by slurrying with 30 pounds of azeotropic ethyl alcohol. The pH of the slurry was adjusted to pH 7 at the end of the second ethyl alcohol wash. The ethyl alcohol was removed from the slurry after each wash by filtration. The temperature throughout the process was maintained at about 75° F. and after the last alcohol wash the product was air dried. The product was a bland flavored, odorless, cream colored flour. Ten grams of this flour was heated to 190° F. in 100 ml. of water and an irreversible, white, pasty gel was obtained upon cooling.

The product of the present invention is bland in flavor, odorless, cream colored to white in color and may be employed in many food products where it is desirable to increase the protein content. Such products as potatoes, whipped toppings, meat substitutes, spreads and the like are products in which the soy protein flour has been found to be very suitable.

Although this invention has been herein described in specific embodiments, it is to be understood that these examples are for purposes of illustration only and that the invention is not limited thereto, reference being had to the appended claims for a definition of the scope of this invention.

What is claimed is:

1. A process for treating a soybean flour characterized by its undesirable flavor, odor and color to produce a bland, odorless, substantially color-free soybean flour which comprises mixing a soybean flour which is substantially oil free in an aqueous solution to form a slurry thereof; digesting the soybean in the solution at about pH 4–6 by maintaining said slurry at a temperature of 70° to 212° F. for 10–120 minutes to insure complete and intimate contact of all soybean flour surfaces to thereby maximize release of the bitter and beany flavor principles and extract water solubles, said time and temperature of digestion being in inverse relationship to each other; substantially removing the aqueous solution from said digested soybean flour; mixing said digested soybean flour with a volatile, polar, organic water miscible solvent to create a second slurry; maintaining the pH of the second slurry at between pH 4 and 6.5; and separating from said slurry a bland and colorfree soybean flour.

2. The process of claim 1 wherein the digested soybean flour is water washed at a pH of 4–6 prior to the solvent treatment.

3. The process of claim 1 wherein the soybean flour is digested in an acid solution of water miscible solvent and at least 28% water.

4. The process of claim 3 wherein the digested soybean flour is water washed at a pH of 4–6 prior to the solvent treatment.

5. A process for treating a soybean flour characterized by its undesirable flavor, odor and color to produce a bland, odorless, substantially color-free soybean flour which comprises mixing one part by weight of soybean flour which is substantially oil free in 2–100 parts by weight of water to form a slurry thereof, adjusting the pH of said mixture to about pH 4–6, digesting the soybean in solution at a temperature of 70° to 212° F. for 10–120 minutes to effect complete and intimate contact of all soybean flour surfaces to maximize release of the bitter and beany flavor principles and extract water solubles, said time and temperature of digestion being in inverse relationship to each other; substantially removing the aqueous solution from said digested soybean flour, water washing said digested flour at a pH of 4–6; mixing said flour with 1–100 parts by weight of a water miscible volatile, polar, organic solvent to create a second slurry; maintaining the pH of the slurry at between pH 4 and 6.5; heating the latter mixture at a temperature of between 70° F. and the reflux temperature of said water miscible solvent for 5–120 minutes; and separating from said mixture a bland and color-free soybean flour.

6. The process of claim 5 wherein the soybean flour is digested in an acid solution of water miscible solvent and at least 28% water.

7. A process for treating soybean flour characterized by its undesirable flavor, odor and color to produce a bland, odorless, substantially color-free soybean flour which comprises mixing one part by weight of substantially oil-free soybean flour in 3–100 parts by weight of water to form a slurry; raising the pH of said slurry to about pH 9–13; heating said mixture for 10 minutes to 24 hours at a temperature below 140° F. to partially degrade the protein in the soybean; adjusting the pH of said slurry to about pH 4–6; digesting said slurry at a temperature of 70° to 212° F. for 10–120 minutes to insure complete and intimate contact of all soybean flour surfaces to maximize release of the bitter and beany flavor components and extract water solubles, said time and temperature of digestion being in inverse relationship to each other; separating the aqueous solution from said digested flour; mixing said flour with a volatile, polar, organic water miscible solvent to create a second slurry; maintaining the pH of said second slurry at 4–6.5; heating said slurry at a temperature of between 70° F. and the reflux temperature of said water miscible solvent for 5–120 minutes; and separating from said slurry bland and color-free soybean flour.

8. The process of claim 7 wherein the digested soybean flour is water washed at a pH of 4–6 prior to the solvent treatment.

9. The process of claim 7 wherein the soybean flour is digested in an acid solution of water miscible solvent and at least 28% water.

10. The process of claim 9 wherein the digested soybean flour is water washed at a pH of 4–6 prior to solvent treatment.

References Cited in the file of this patent

UNITED STATES PATENTS

| | | |
|---|---|---|
| 1,314,298 | Yomamoto | Aug. 26, 1919 |
| 2,052,215 | Cohn | Aug. 26, 1936 |
| 2,238,329 | Julian | Apr. 15, 1941 |
| 2,244,680 | Engstrom et al. | June 10, 1941 |
| 2,444,241 | Beckel et al. | June 29, 1948 |
| 2,683,091 | Singer et al. | July 6, 1954 |
| 2,881,076 | Sair | Apr. 7, 1959 |
| 2,881,159 | Circle | Apr. 7, 1959 |

FOREIGN PATENTS

| | | |
|---|---|---|
| 551,692 | Great Britain | Mar. 5, 1943 |

OTHER REFERENCES

Journal of Agricultural Research, Nov. 15, 1938, pp. 738, 739 and 741.

Industrial and Engineering Chemistry, October 1939, pp. 1285, and 1287.

Industrial and Engineering Chemistry, December 1945, pp. 1233 and 1236.